US011055716B2

United States Patent
Al Anbari et al.

(10) Patent No.: US 11,055,716 B2
(45) Date of Patent: Jul. 6, 2021

(54) RISK ANALYSIS AND FRAUD DETECTION FOR ELECTRONIC TRANSACTION PROCESSING FLOWS

(71) Applicant: PAYPAL, INC., San Jose, CA (US)

(72) Inventors: Harith Al Anbari, San Jose, CA (US); Laura Wong, San Jose, CA (US); Hemal Doshi, San Jose, CA (US); Shriram Sundaravalli, San Jose, CA (US); Yaeli Cohen, San Jose, CA (US); Novalina Nursalim, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 692 days.

(21) Appl. No.: 15/269,682

(22) Filed: Sep. 19, 2016

(65) Prior Publication Data

US 2018/0082299 A1     Mar. 22, 2018

(51) Int. Cl.
| | |
|---|---|
| *G06Q 40/08* | (2012.01) |
| *G06Q 20/40* | (2012.01) |
| *H04L 29/06* | (2006.01) |
| *G06Q 20/10* | (2012.01) |

(52) U.S. Cl.
CPC ....... *G06Q 20/4016* (2013.01); *G06Q 20/102* (2013.01); *G06Q 40/08* (2013.01); *H04L 63/08* (2013.01); *H04L 63/1416* (2013.01)

(58) Field of Classification Search
CPC .. G06Q 20/4016; G06Q 20/102; G06Q 40/08; H04L 63/1416
See application file for complete search history.

(56) References Cited

U.S. PATENT DOCUMENTS

| | | | | |
|---|---|---|---|---|
| 2006/0271457 | A1* | 11/2006 | Romain | G06Q 40/02 705/35 |
| 2010/0145857 | A1* | 6/2010 | Davila | G06Q 20/40 705/44 |
| 2014/0019352 | A1* | 1/2014 | Shrivastava | G06Q 20/02 705/41 |

OTHER PUBLICATIONS

Terri Bradford, Where Social Networks, Payments and Banking Intersect, Dec. 2012, Federal Reserve Bank of Kansas City, web, 2-5 (Year: 2012).*

* cited by examiner

*Primary Examiner* — I Jung Liu
(74) *Attorney, Agent, or Firm* — Haynes and Boone, LLP

(57) ABSTRACT

There are provided systems and methods for risk analysis for fraud detection for electronic transaction processing flows. An entity, such as a user, business, or other personal or commercial entity, may interact with another entity in order to engage in a transaction, for example, a purchase, transfer, or other transaction process. The first entity may utilize a service provider to engage in transaction processing, which may provide multiple flows that govern the features provided to the entities. Such features may include fees required for transaction processing. In order to ensure that the entities do not fraudulently choose a flow type that decreases or cancels fees due, or does not provide certain protections to other parties, a risk analysis of the transaction and the account may be executed based on accessible historical data and identifiers. Thus, the entities may automatically be entered to one flow over another based on the risk analysis.

20 Claims, 7 Drawing Sheets

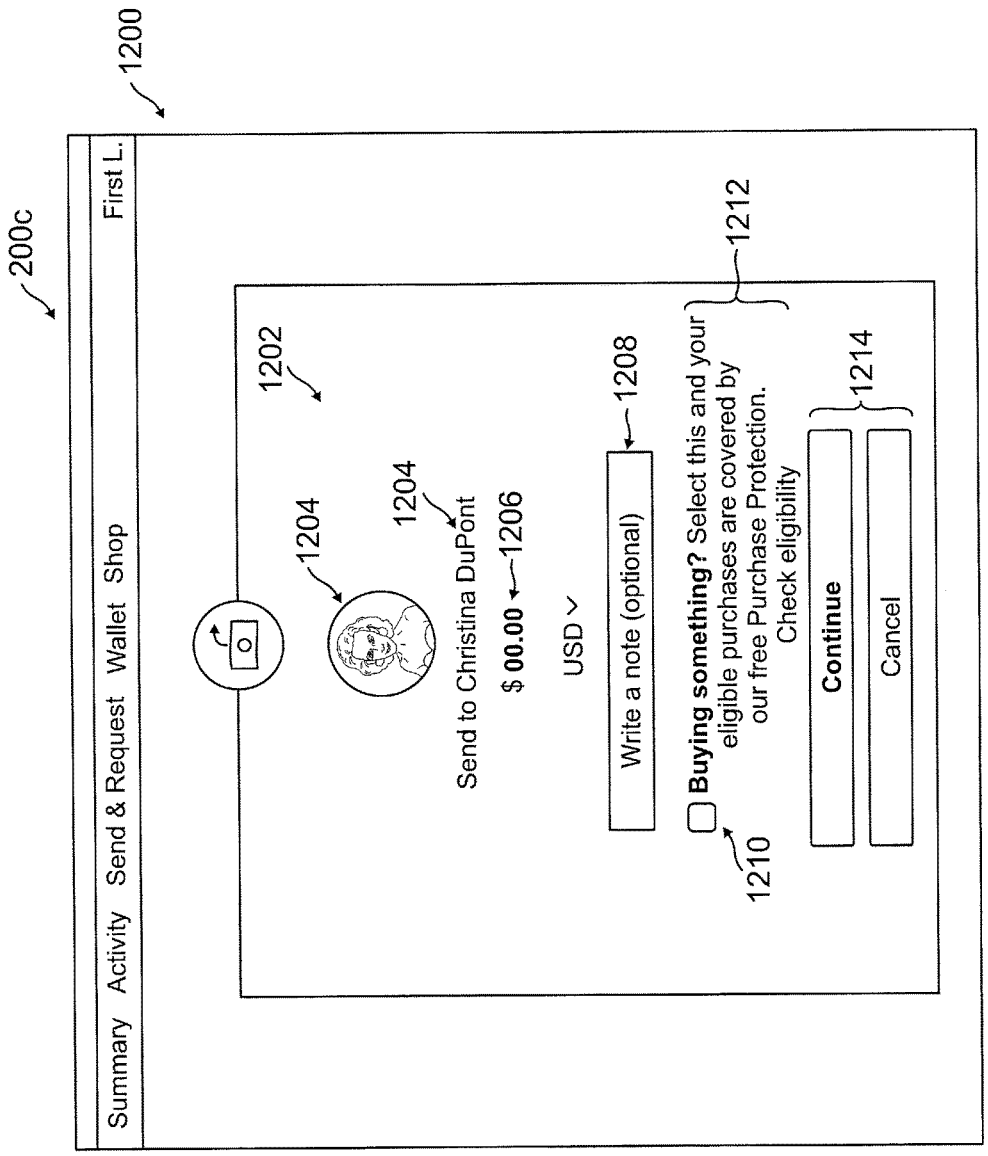

RISK ANALYSIS AND FRAUD DETECTION FOR ELECTRONIC TRANSACTION PROCESSING FLOWS

TECHNICAL FIELD

The present application generally relates to risk models for transaction processing and more specifically to risk analysis and fraud detection for electronic transaction processing flows.

BACKGROUND

Various types of service providers may provide processing services to users, merchants, other types of businesses, and different entities. The types of processing services may include different flows to the processing services, where the different flows govern or provide the types of features and processes that the entities may utilize during use of the processing services. For example, one type of processing service may provide a flow that allows for free transfer services between known users, such as friends and family. In contrast, a transaction processing service between a customer and a merchant or other business may instead require a fee paid by one of the parties, but may also provide consumer protection to the customer and/or fraud protection to the merchant. However, in order to avoid these fees or other undesirable processing service features for a particular flow, one or more of the entities may defraud the service provider by selecting an incorrect flow. Thus, the service provider may lose valuable business and may provide inadequate services or be at risk of non-compliance with required laws, legal guidelines, and/or merchant/company policy. Moreover, where one of the entities is less savvy than the other entity during use of the processing service(s) of the service provider, the other entity may take advantage of the first entity by requesting that they enter into a processing service flow that is disadvantageous to the first entity and more preferable to the other entity, for example, to avoid fees required by a merchant while not providing consumer protection support to the first entity.

BRIEF DESCRIPTION OF THE DRAWINGS

FIG. 2C is an exemplary transaction processing interface after entry of input to the transaction processing flow, according to an embodiment;

Figure 1:
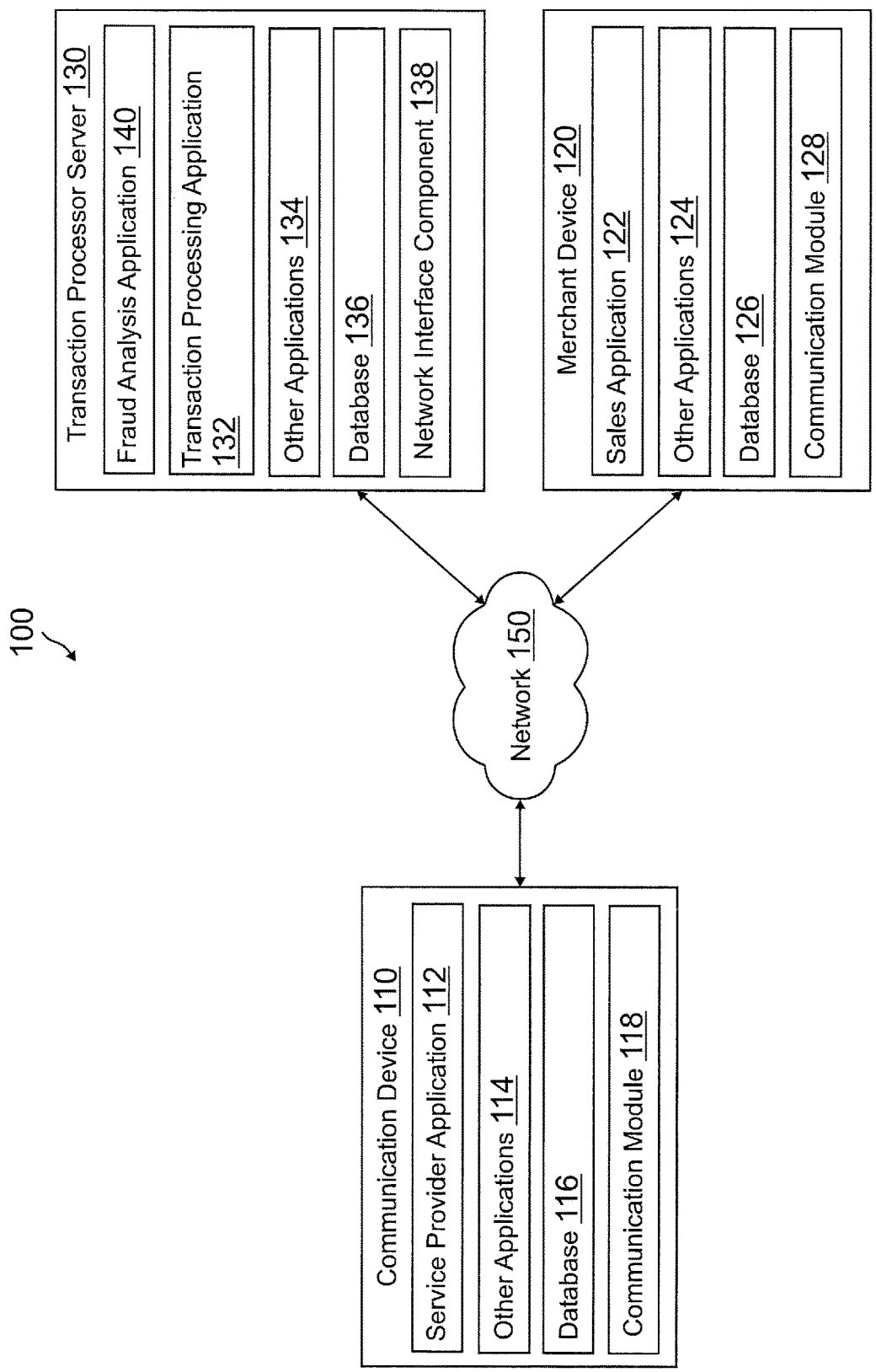
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for risk analysis and fraud detection for electronic transaction processing flows. Systems suitable for practicing methods of the present disclosure are also provided.

One or more entities, such as personal users or consumers, groups of users, merchants, businesses, or other commercial or governmental agencies, may wish to engage in electronic transaction processing with one or more other entities. For example, a first entity may wish to provide a payment to a second entity for a transaction, such as a purchase of one or more items, a bill payment, or other type of required payment or transfer of money between two parties interacting to conduct business or engage in a commercial transaction. In other embodiments, the first entity may wish to conduct a personal transaction, such as a transfer between known entities (e.g., friends and/or family members transferring money) or a payment between friends (e.g., for reimbursement for borrowed money, a portion of a bill, etc.). Various service providers may provide transaction processing services that may allow two or more entities to engage in transaction processing for a transaction. For example, a payment provider service may offer transaction processing services that provide transfers, payment services, reimbursement or refund services, and other type of financial services including payment account establishment and/or management. These service providers may further provide additional types of benefits, features, and/or processes to users, such as buyer/consumer protection, payment/transfer insurance, fraud protection and reimbursement guarantees, and other types of services that may be offered for free depending on the transaction processing service and/or entity status, or purchased through payment of a fee (where the fee may be dependent on the transaction cost or a flat fee based on the transaction, service, etc.).

In this regard, a service provider may provide multiple different transaction processing flow types for transaction processing. For example, a transaction processing flow may correspond to the normal or default procedure and processes, executable by the service provider, to provide transaction processing services to entities in a transaction. Each of the transaction processing flow types, models, or procedures may determine the processes and features available to the entities engaging in the transaction that is processed using the selected transaction processing flow type. Thus, transaction processing flow types may determine the fees applicable to one or more of the entities, the protections available to the entities as a result of transaction processing and/or payment, and other types of transaction processing services available to the entities as a result of utilizing a transaction processing flow type to process the transaction between the entities. One type of transaction processing flow may be available to friends, family, or other known acquaintances that allows for processing of a transfer, purchase payment, or other type of financial transaction between two or more entities that are known to each other. In this regard, the "friends and family" or personal type of transaction processing flows may not require a fee for use of the transaction processing flow services of the service provider but may also not provide consumer protection, such as reimbursement protection and processes, refund processes, and/or fraud protection. In contrast, a merchant or consumer type of transaction processing flow may require the buyer and/or seller in a transaction to pay a fee for use of the transaction processing flow and to process the transaction, but may further provide other services including the aforementioned consumer protection services.

The entities may further be required to establish an account with the service provider in order to engage in transaction processing and utilize one or more types of transaction processing flows. The entities may be required to provide entity information to establish the account, such as personal information for a user, business or merchant information for such an entity, or other types of identification information including a name, address, and/or other information. The entities may also be required to provide financial information, including payment cards (e.g., credit/debit cards), bank account information, gift cards, and/or benefits/ incentives. In order to create an account, each entity may be required to select an account name and/or provide authentication credentials, such as a password, personal identification number (PIN), answers to security questions, and/or other authentication information. Once an account is created, the account may be accessed through a web browser from a website of the service provider and/or a dedicated application of the service provider, such as a mobile smart phone application. The entities may engage in transaction processing through accessing their respective accounts and providing transaction information for the transaction. Moreover, a token may be issued to the entity for their respective account, where the token may include data (which may be encrypted) allowing the service provider to identify the entity and their account and authenticate the entity. Thus, the token may be transmitted to other entities during transaction processing, which may allow the service to identify and authenticate the entity's account and engage in transaction processing. Additionally, the online payment provider or other service provider may provide digital wallet services, which may offer financial services to send, store, and receive money, process financial instruments, and/or provide transaction histories. Thus, the accounts may store information associated with each entity, which may be utilized to determine a type of transaction engaged in by the entity and/or a type of transaction processing flow required by the entity.

In this regard, a computing device on an entity may further include a mobile payment application or more generally a transaction processing application, which may be configured to send and receive payments to another party, such as another user and/or a merchant, or otherwise engage in transaction processing. In various embodiments, a website may provide the transaction processing services, and thus may be accessed by a web browser application. The application (or website) may be associated with a payment provider, such as PayPal® or other online payment provider service, which may provide payments and the other aforementioned transaction processing services on behalf of user, merchants, and other entities. The application may execute on the computing device for a user or a merchant, and may provide various functionalities and processes to the user and/or merchant. For example, a user may utilize the application to send and/or receive payments between the user and another user/merchant. The user may wish to provide a payment for a transaction with a user/merchant, transfer money to another family/friend, engage in a transaction previously generated and provided to the payment application, initiate a transaction with another entity, or perform another process. The merchant may similarly send and/or receive payments between the merchant and another user/merchant, which may include receiving payment for transactions, providing payments to employees and/or for business expenses, transfer money between accounts, or perform further transaction processing. Other entities, such as charitable organizations and businesses may also utilize the application, for example, to receive donations from various parties and/or pay business expenses.

Thus, the service provider may receive transaction information during transaction processing, which may correspond to entities in a transaction (e.g., an entity name, identifier, and/or token, such as a token used to identify an account of the entity), items in a transaction, transaction cost, tax, tip, shipping information, a message to an entity in the transaction and/or messages between the entities, and other types of transaction information. The transaction information may be generated from a transaction between the entities, and may be provided to the service provider for processing through selection of a type of a transaction processing flow by the service provider. The transaction information may indicate the type of transaction, such as a transaction between a business or merchant and a user or between two users for personal reasons. The transaction information may include an initial selection of a transaction processing flow type, such as a personal transaction and request for a personal transaction processing flow or a commercial transaction and request for a commercial transaction processing flow. The transaction processing flow may be selected by one or more of the entities in the transaction, for example, on request for transaction processing by the service provider and/or during entry of the transaction information.

However, in other embodiments, neither entity may select the type of transaction processing flow, where selection and/or advisement of selection of the transaction processing flow type may be performed by the service provider. The transaction information may be used to determine a type of transaction, such as a personal transaction, commercial transaction, or other transaction. Thus, the service provider may determine the appropriate transaction processing flow type depending on the transaction information and the type of transaction that requires a particular flow, the entities information and/or accounts, and/or flags of the entities and/or transaction as potentially abusive of an incorrect type of transaction processing flow, as discussed herein.

Utilizing the transaction information, such as identification information of the entities (e.g., an identifier, account information, and/or token for each entity), the service provider may access or retrieve account information for an account for each entity. The account information for the entity may include information that may be utilized to further determine a type of transaction that an entity is engaging in with another entity. For example, if the entity is marked as a merchant in the account information, the entity may be more likely to be engaging in a business or commercial transaction, such as selling an item to a consumer. In contrast, an account for an individual user may be utilized for personal transactions, such as rent payments to a roommate, transfers to a family member, or other type of personal transaction. The account information may therefore include the aforementioned entity information and/or financial information for each entity in the transaction. Additionally, the account information may include previous transactions in a transaction history, which may include transaction types engaged in by the entity with the same entity in the transaction and/or other entities, as well as used transaction processing flow types with the same entity and/or other entities.

In further embodiments, the account information may include account flags that identify the account as engaging in particular types of transactions and/or utilizing certain transaction processing flow types. For example, where the account is utilized solely with another account (e.g., to transfer money where a merchant may utilize multiple accounts and/or two family members may transfer money), the account of the entity may be utilized for personal transaction types or transaction processing flows that do not require consumer protection. However, where the account engages with multiple other entities, the account information may indicate that the entity is engaging in a commercial transaction requiring a fee and consumer protections. Moreover, an account that previously attempts to use or uses one type of transaction processing flow, such as a personal transaction processing flow that does not require a fee for use but provides no consumer protection, but the account fraudulently uses the type of the transaction processing flow (e.g., is reported or it is determined the entity for the account engaged in a different type of transaction require a different type of transaction processing flow), the account may be flagged as abusive and that the account should be using another type of transaction processing flow.

Thus, the service provider may determine a transaction type for the transaction engaged in between the entities using the transaction information and/or the account information. For example, the transaction information may include one or more items for sale to the other entity, which may indicate that the transaction is a commercial transaction. A message field may include a message, which may indicate the transaction type and/or the required transaction processing flow type through recognition of characters, words, and/or phrases in the message (e.g., "ship items to X" may indicate a commercial transaction, while "rent" or "refund" may indicate a transaction not requiring a fee). Thus, the transaction type may be determined based on a transaction amount, an item in the transaction, an address for the transaction, an account history for each entities account, and/or a message associated with the transaction. The transaction type may also be determined using instead or also using the account information, such as an indication of the entities purpose or use of the account, as well as flags for the account. Once a transaction type is determined, the service provider may determine a required or suggested transaction processing flow type, such as a transaction processing flow for personal transactions without a fee but between trusted users that do not require consumer protection or a transaction processing flow for commercial transactions requiring a fee but providing consumer protection between unknown parties or parties in danger of fraud.

Based on the type of transaction processing flow required or suggested for the transaction type of the transaction between the entities, an option may be automatically selected by the service provider during transaction processing. The option may be selected by automatically entering input into the transaction processing flow that selects the type of the transaction processing flow and/or the features, processes, and/or services provided for transaction processing of the transaction through the selected type of the transaction processing flow. For example, input may be entered prior to or during selection of a transaction processing flow type that selects one of the transaction processing flow types, such as a personal or "friends and family" transaction processing flow that does not require a fee but does not provide consumer protection, or a consumer or "goods and services" transaction processing flow that requires a seller or merchant to pay a fee but provides consumer protection. The transaction processing flow type may be selected through entry of input to an interface option output to a user through a graphical user interface of an application, such as an interface of a webpage for a website of the service provider (e.g., visible in a browser application) or an interface of a dedicated mobile application. The input may correspond to checking a box for a transaction processing flow type, selecting a drop down menu, or entering text to the interface. The interface option for the transaction processing flow type may be selected in the interface for the entity requesting transaction processing, for example, the entity requesting a payment to another entity, such as a buyer in a transaction or a party requesting to transfer money to another party. In other embodiments, the interface option may be selected through the input provided to the receiving entity for the payment or transfer, for example, by the seller or receiving party for the transfer.

Moreover, the input may further be able to be edited by one or more of the entities in order to change to transaction processing flow type. For example, where a box may be checked to enter the consumer or goods and services flow requiring a fee for transaction processing, one or more of the entities may change the transaction processing flow type by unchecking the box or otherwise entering input. When an entity changes the type of the transaction processing flow, information, such as an alert, may display in an interface that informs the entity of the processes, features, and/or services of the originally required or suggested transaction processing flow type and/or the newly selected transaction processing flow type (through the change input by the entity). For example, the displayed information may inform the user of the change in fees, consumer protection, insurance, reimbursement or refund policies, and/or other features that change, were previously selected, and/or are now selected from the transaction processing flow type. The entity changing the transaction processing flow type may be required to confirm reading the information and/or the requested change in the transaction processing flow type.

Thus, the service provider may then process the transaction using the selected transaction processing flow type. As a result of processing the transaction using the selected transaction processing flow type, one or more of the entities may be required to pay a fee (which may be added to or deducted from a payment for the transaction or requested from an entity). Additionally, one or more of the entities may receive benefits and other services as a result of the transaction processing flow type, such as consumer and/or fraud protection services, which may be utilized with the service provider. Other types of the services and/or features may also be provided to the entities. A transaction history may record a receipt or other history of the transaction, which may be utilized to provide goods, services, and/or products (referred to herein as an "item" or "items") to an entity in the transaction. Moreover, a payment may be provided by deducting an amount from one entity's account and crediting the amount (which may have deducted a fee) to the account of the other entity.

The service provider may determine whether one or more of the entities behaved abusively by selecting an incorrect transaction processing flow type. For example, the service provider may flag an entity and/or account for the entity as abusive or potentially abusive if the entity attempts to enter or select an incorrect transaction processing flow for the transaction type engaged in by the entity. In further embodiments, if the entity changes the transaction type automatically preselected by the service provider, to another transaction processing flow type that does not appear to match the transaction type, the service provider may flag the entity as abusive or potentially abusive. Moreover, post-transaction processing reports and/or analysis may be utilized to determine if the entity is abusing or potentially abusing an incorrect transaction processing flow type, for example, to avoid transaction processing fees. Post-transaction processing reports may include requests for consumer protection, fraud reports and protection, reimbursement for a transaction, or other types of requests or reports that correspond to a commercial or sales transaction. Such reports resulting from a transaction processed using a personal transaction processing flow type that does not provide such protections may be utilized to determine that the buyer entity or seller entity acted abusively, for example, to avoid a fee, and may therefore be used to flag an account or entity as abusive. Thus, during future transaction processing, the flag of the entity or account of the entity as abusive may be used to automatically select the transaction processing flow type required by the entity during transaction processing. In this regard, if the entity is flagged as abusing a free personal or "friends and family" transaction processing flow type to avoid a fee but not provide consumer protection during sales to other entities, the commercial or "goods and sales" transaction processing flow type may automatically be selected for all transaction processing engaged in by the flagged entity.

Moreover, in certain embodiments, an entity and/or account for an entity that continues to abuse an incorrect transaction processing flow type may be blacklisted or may be forced to utilize (e.g., not allowed to change) a particular transaction processing flow type. In such embodiments, the entity may be able to change the transaction processing flow type through personal correspondence and provision of additional information to the service provider.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a merchant device 120, and a transaction processor server 130 in communication over a network 150. The user or other entity (not shown) may utilize communication device 110 to utilize the various features available for communication device 110, which may include processes and/or applications associated with transaction processing for a transaction between the user and a merchant or other entity (not shown) associated with merchant device 120. During transaction processing of the transaction, the user and/or the merchant may utilize communication device 110 and/or merchant device 120, respectively, to engage in a type of a transaction processing flow used to process the transaction. Transaction processor server 130 may automatically select the transaction processing flow type based on received transaction information for the transaction between the user and the merchant. Additionally, the user and the merchant may utilize communication device 110 and/or merchant device 120, respectively, to establish accounts with transaction processor server 130, where account information for the accounts may further be utilized to select a transaction processing flow type for processing the transaction. For example, the accounts may include account flags where the user and/or the merchant may have previously engaged in abusive behavior by selecting or attempting to select an incorrect transaction processing flow type.

Communication device 110, merchant device 120, and transaction processor server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with merchant device 120, and/or transaction processor server 130. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110 of FIG. 1 contains a service provider application 112, other applications 114, a database 116, and a communication module 118. Service provider application 112 and other applications 114 may correspond to executable processes, procedures, and/or applications with associated hardware. In other embodiments, communication device 110 may include additional or different modules having specialized hardware and/or software as required.

Service provider application 112 may correspond to one or more processes to execute software modules and associated devices of communication device 110 to enter one or more payment instruments or other funding sources for storage in a digital wallet associated with a payment account (e.g., stored and/or serviced by transaction processor server 130), access the digital wallet and/or payment account for use, and engage in transaction processing with another entity through transaction and payment processing using a transaction processing flow having a specific type, where the specific type may be suggested and/or automatically selected by transaction processor server 130. In this regard, service provider application 112 may correspond to specialized hardware and/or software utilized by a user of communication device 110 that provides an interface to permit the user to enter input and other data for payment instruments, for example, through an input device (e.g., touch screen with a graphical user interface, keypad/keyboard, mouse, etc.) and/or through a data capture device (e.g., scanner, camera, other optical device, etc.) Such information may be stored with transaction processor server 130 for use with an online digital wallet and/or account for the user, which may be utilized for transaction processing with another entity, such as a merchant associated with merchant device 120.

In various embodiments, information for the account may also be stored to communication device 110 for use in an offline environment. The account accessible through service provider application 112 may be used to initiate, receive, and/or process/complete transactions using services provided by transaction processor server 130. Once entered, the payment instruments may be communicated to transaction processor server 130 over network 150 by service provider application 112 for establishment and/or maintenance/update of the account and/or entry into the digital wallet for the user. The user of communication device 110 may also enter benefits to service provider application 112. The benefits may correspond to one or more of rewards programs, rewards programs membership level, rewards program points, available items in at least one rewards program, cash-back amounts for the at least one rewards program, airline miles, promotional credit, promotional credit rates, promotional discount rate, merchant discounts, merchant discount rates, and merchant coupons.

Service provider application 112 may utilize one or more user interfaces, such as graphical user interfaces presented using an output display device of communication device 110, to enable the user associated with communication device 110 to select and provide payment. In various embodiments, service provider application 112 may correspond to a general browser application configured to retrieve, present, and communicate information over the Internet (e.g., utilize resources on the World Wide Web) or a private network. For example, service provider application 112 may provide a web browser, which may send and receive information over network 150, including retrieving website information (e.g., a website for transaction processor server 130), presenting the website information to the user, and/or communicating information to the website, including payment information for transaction processed through transaction processor server 130.

However, in other embodiments, service provider application 112 may include a dedicated application of transaction processor server 130 or other entity (e.g., a merchant), which may be configured to assist in processing transactions. The interface(s) providing by service provider application 112 may be utilized to engage in a transaction processing flow having a particular type for a transaction type engaged in by the user associated with communication device 110. In this regard, input may be automatically entered to a transaction processing flow in order to select a type for the transaction processing flow and/or the services and/or features of the transaction processing flow. The input may be automatically entered and displayed to the user through service provider application 112 by transaction processor server 130, as discussed herein. However, service provider application 112 may further allow for the user to change the transaction processing flow type through further input, which may affect the services and features provided by transaction processor server 130 for processing the transaction, as discussed herein. Moreover, service provider application 112 may be utilized to view any account flags for abusive or potentially abusive use of an incorrect transaction processing flow.

Service provider application 112 may be utilized to select payment instrument(s) for use in providing payment for a purchase transaction, transfer, or other financial process. As discussed herein, service provider application 112 may utilize user financial information, such as a credit card, bank account, or other financial account, as a payment instrument when providing payment information. Additionally, service provider application 112 may utilize a digital wallet stored with an account with a payment provider, such as transaction processor server 130, as the payment instrument, for example, through providing a token that identifies the account and authenticates the user for use of the account. Selection of a payment instrument may occur prior to, at, or after establishment of the financial process. Transaction processor server 130 may then use the payment instrument during processing of payment, as discussed herein with respect to transaction processor server 130.

Service provider application 112 may be utilized to view the results of payment, for example, using transaction histories, dispute resolution processes, and other post-transaction process. Service provider application 112 may also store and/or utilize a digital token for the payment account, digital wallet, and/or payment instruments of the user. Thus, service provider application 112 may provide the digital token to authenticate the user and/or use the user's payment account, digital wallet, and/or payment instruments. Service provider application 112 may use such a token during transaction processing to authenticate the user and complete transaction processing by providing the token, which may be encrypted and/or provided through a secure channel, to a transaction participant to authenticate the user and/or the user's payment account, digital wallet, and/or payment instruments to transaction processor server 130 and allow for transaction processing and payment using the user's payment account, digital wallet, and/or payment instruments.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices, including speakers.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with service provider application 112 and/or other applications 114, identifiers associated with hardware of communication device 110, or other appropriate identifiers, such as identifiers used for payment/user/device authentication or identification, which may be communicated as identifying communication device 110 to transaction processor server 130. Database 116 may include webpage and/or application information for a transaction processing flow type, as well as received transaction information for processing a transaction using the transaction processing flow type. In various embodiments, account information and/or digital wallet information may be stored to database 116 for use by communication device 110.

Communication device 110 includes at least one communication module 118 adapted to communicate with merchant device 120 and/or transaction processor server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Merchant device 120 may be implemented using any appropriate hardware and software configured for wired and/or wireless communication with communication device 110 and/or transaction processor server 130. Although described below as a device, merchant device 120 may correspond to a device, server, or cloud computing architecture to provide sales of items, for example, through an online marketplace accessible over a network connection with merchant device 120 and/or a physical merchant location. Merchant device 120 may further be used to process payments for items and provide incentives for purchase of items and/or advertisement of items to other users. Although a merchant device is shown, the merchant device may be managed or controlled by any suitable processing device. Although only one merchant device is shown, a plurality of merchant devices may function similarly.

Merchant device 120 of FIG. 1 contains a sales application 122, other applications 124, a database 126, and a communication module 128. Sales application 122 and other applications 124 may correspond to processes, procedures, and/or applications executable by a hardware processor, for example, a software program. In other embodiments, merchant device 120 may include additional or different modules having specialized hardware and/or software as required.

Sales application 122 may correspond to one or more processes to execute modules and associated specialized hardware of merchant device 120 that provides an interface and/or online marketplace to sell one or more items offered by a merchant (not shown) associated with merchant device 120, and further provide checkout and payment processes for a transaction to purchase the items for sale from the merchant corresponding to merchant device 120, where such transaction processing services may be provided through transaction processor server 130. In this regard, sales application 122 may correspond to specialized hardware and/or software of merchant device 120 to provide a convenient interface to permit a merchant to offer items for sale. For example, sales application 122 may be implemented as an application offering items for sale that may be utilized by the merchant or a merchant employee to enter items selected by a user to a transaction, determine a price for the transaction, and initiate a checkout and payment process for the transaction. In other embodiments, sales application 122 may be accessed by communication device 110 to select the items for sale to the user associated with communication device 110.

In certain embodiments, sales application 122 may correspond to a website available over the Internet and/or online content and/or database information accessible through a dedicated application. Thus, sales application 122 may provide item sales through an online marketplace using the website of the merchant. However, in other embodiments, merchant device 120 may be local to a physical merchant location and provide transaction processing processes through interfaces displayed to a merchant or merchant employee at the merchant location. Sales application 122 may include information for a price for the item, a discount for the item, a price change for the item, and/or other incentives for items and/or with the merchant corresponding to merchant device 120 (e.g., rebates, payments, etc.). Sales application 122 may be used to set and/or determine a benefit or incentive provided to a user of communication device 110. The sales data and other item data may be retrievable by communication device 110 and/or transaction processor server 130, such as requestable through an API call, retrievable from a database, and/or scraped from an online resource.

Sales application 122 may be used to establish a transaction once the user associated with communication device 110 has selected one or more items for purchase. Once a payment amount is determined for the transaction for the item(s) to be purchased, sales application 122 may request payment from the user through a transaction processing flow provided by transaction processor server 130. Sales application 122 may receive payment processing information. In such embodiments, the transaction may be processed using a transaction processing flow having a particular type provided by transaction processing server 130. Thus, payment provided to the merchant account, and notification of payment (or failure, for example, where there are insufficient user funds) may be sent to sales application 122. The payment may be made by transaction processor server 130 on behalf of the user associated with communication device 110. In other embodiments, sales application 122 may direct the user to one or more interfaces provided by transaction processor server 130 for transaction processing, where transaction information may be populated to a transaction processing flow for selection of the transaction processing flow type and processing of the transaction.

Thus, sales application 122 may include one or more interfaces to engage in a transaction processing flow having a particular type for a transaction type of the transaction. In this regard, input may be automatically entered to a transaction processing flow in order to select a type for the transaction processing flow and/or the services and/or features of the transaction processing flow. The input may be automatically entered and displayed to the user through sales application 122 by transaction processor server 130, as discussed herein. In other embodiments, the merchant may not view the transaction processing, which may be performed by the user associated with communication device 110. Additionally, sales application 122 may further allow for the merchant to change the transaction processing flow type through further input, which may affect the services and features provided by transaction processor server 130 for processing the transaction, as discussed herein. Moreover, sales application 122 may be utilized to view any account flags for abusive or potentially abusive use of an incorrect transaction processing flow. Sales application 122 may then receive the results of the transaction processing, and complete the transaction with the user, for example, by providing the user the items for the transaction or declining the transaction where the user is not authenticated or the transaction is not authorized (e.g., insufficient funds).

Merchant device 120 includes other applications 124 as may be desired in particular embodiments to provide features to merchant device 120. For example, other applications 124 may include security applications for implementing server-side security features, programmatic client applications for interfacing with appropriate application programming interfaces (APIs) over network 150, or other types of applications. Other applications 124 may also include email, texting, voice and IM applications that allow a user to send and receive emails, calls, texts, and other notifications through network 150. In various embodiments, other applications 124 may include financial applications, such as banking, online payments, money transfer, or other applications associated with transaction processor server 130. Other applications 124 may contain software programs, executable by a processor, including a graphical user interface (GUI) configured to provide an interface to the user.

Merchant device 120 may further include database 126 which may include, for example, identifiers such as operating system registry entries, cookies associated with sales application 122 and/or other applications 124, identifiers associated with hardware of merchant device 120, or other appropriate identifiers, such as identifiers used for payment/user/device authentication or identification. Identifiers in database 126 may be used by a payment/credit provider, such as transaction processor server 130, to associate merchant device 120 with a particular account maintained by the payment/credit provider. Item, sales, and/or benefit information for items sold by the merchant associated with merchant device 120 may be stored to database 126. Database 126 may further include transaction information and/or results, including transaction histories.

Merchant device 120 includes at least one communication module 128 adapted to communicate with communication device 110 and/or transaction processor server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor server 130 may be maintained, for example, by an online service provider, which may provide transaction processing services on behalf of users and/or merchants. In this regard, transaction processor server 130 includes one or more processing applications which may be configured to interact with communication device 110, merchant device 150, and/or another device/server to facilitate transaction processing. In one example, transaction processor server 130 may be provided by PAYPAL®, Inc. of San Jose, Calif., USA. However, in other embodiments, transaction processor server 130 may be maintained by or include another type of service provider, which may provide connection services to a plurality of users.

Transaction processor server 130 of FIG. 1 includes a fraud analysis application 140, a transaction processing application 132, other applications 134, a database 136, and a network interface component 138. Transaction processing application 132 and other applications 134 may correspond to executable processes, procedures, and/or applications with associated hardware. In other embodiments, transaction processor server 130 may include additional or different modules having specialized hardware and/or software as required.

Fraud analysis application 140 may correspond to one or more processes to execute software modules and associated specialized hardware of transaction processor server 130 to analyze transaction and account information for a transaction and entities involved in the transaction to determine a transaction type and a required transaction processing flow type for processing the transaction type, as well as determine a risk that the entities are acting fraudulently by attempting to utilize an incorrect transaction processing flow type. In this regard, fraud analysis application 140 may correspond to specialized hardware and/or software to receive transaction information and/or access account information for determination of whether entities in a transaction are acting fraudulently by selecting an incorrect transaction processing flow type and/or automatically select a transaction processing flow type depending on the received information. For example, transaction information for a transaction may correspond to the name or other identifier for entities in the transaction, items involved in the transaction (e.g., sold to one or more entities), a cost of the transaction, additional costs (e.g., tax, tip, etc.), a message for the transaction (e.g., a shipping address, note to customer, item information, etc.), shipping information, and/or other information for the transaction.

Based on the transaction information, fraud analysis application 140 may determine whether the transaction is personal or between known acquaintances that does not require consumer protection (e.g., fraud protection, refund services, etc.), whether the transaction is commercial or between buyers and sellers that requires a fee for transaction processing and provides consumer protection, or whether the transaction is another type of transaction requiring different services to process through another type of transaction processing flow types. For example, a message field may be analyzed for key words to determine a commercial transaction, or items sold and a cost of the transaction may indicate a commercial transaction.

Account information may also be utilized by fraud analysis application 140 to determine a transaction type for the transaction information. The account information may include entity information in the account, financial information, past transactions using the account, account purpose and use, and other accounts interacting with the account. In this regard, an account for a named merchant may be utilized to determine that the transaction type is commercial instead of personal for a transaction with a previously unknown user. Similarly, past transactions may be compared between the entities, such as two users that may transfer the same amount of money monthly (e.g., for rent) or two unknown entities performing a one-time transaction similar to other sales transactions in the past by one of the entities. Moreover, the number of interacting accounts may indicate a transaction type, such as multiple transactions with different accounts a day being more likely to be commercial transactions, while transactions with a single other account likely to be personal transfers between known users or the same user. Additionally, it may be detected whether the accounts are linked or share an entity identifier, such as the same name, address, financial information, or other information, in order to determine whether the transaction is personal or commercial in nature. Moreover, previously established account flags that flag an account as previously having acted fraudulently by selecting and/or utilizing an incorrect transaction processing flow may be utilized to select a correct transaction processing flow, for example, by flagging the account as utilizing a personal transaction processing flow to avoid a fee where the account should have used a commercial flow for a previous transaction.

Thus, fraud analysis application 140 may determine transaction type. Based on the transaction type, fraud analysis application 140 may determine a type of transaction processing flow required by the entities or appropriate/designated for processing the transaction. Where a transaction processing flow type has not yet been selected by the entities, fraud analysis application 140 may automatically enter input during transaction processing of the transaction between the entities to select a correct transaction processing flow type associated with the transaction type. Such input may be entered during transaction processing using transaction processing application 132. Additionally, transaction processing application 132 may allow the entities, such as the user or the merchant, to change the transaction processing flow type, where fraud analysis application 140 may output information alerting the user and/or the merchant of the change to the transaction processing flow type, and the resulting changes in services and/or features from the change. Fraud analysis application 140 may require confirmation from the user and/or the merchant for the change, and may further analyze the change and whether the user and/or the merchant have acted fraudulently by making the change, for example, based on the suggested and/or selected transaction processing flow type for the determined transaction type.

Additionally, in order to determine whether the entities (e.g., the user and/or the merchant) are acting fraudulently, fraud analysis application 140 may determine whether one or more of the entities selected the incorrect transaction processing flow type and/or requested a change to an incorrect transaction processing flow types, for example, the avoid payment of a fee by utilizing a personal transaction processing flow that does not afford the user consumer protection with the merchant. Fraud analysis application may compare the determined transaction processing flow type for the transaction type to a transaction processing flow type selected by the user and/or merchant, or changed by the user or the merchant. In various embodiments, the user may be required to select the transaction processing flow type during initiating or processing the transaction.

However, in other embodiments, the merchant may also select the transaction processing flow type and request payment from the user. If the user and/or the merchant (or other entity) is acting fraudulently, fraud analysis application 140 may flag the account as abusive of potentially abusive of a specific type of transaction processing flow. Thus, during future transaction processing, the account flag may be utilized to determine that the account previously abused a certain transaction processing flow type by utilizing it incorrectly, and the flag may cause fraud analysis application 140 to select another transaction processing flow type even when the transaction processing flow type incorrectly abused by the account is selected (e.g., automatically select a consumer flow over a personal flow). Such account flag information may be utilized to automatically select the transaction processing flow type and/or enter input causing selection of the transaction processing flow type. For example, where the merchant is previously flagged as acting abusively by requesting users select a personal flow to avoid transaction fees but not provide consumer protection, future users wish to process transactions with the merchant may automatically be guided or placed in a commercial transaction processing flow when processing transactions with the merchant. Thus, the account flag may be used to cause selection of the transaction processing flow type by an entity wishing to interact with the flagged account. Moreover, an administrator may perform review of flagged accounts to determine whether the flags are appropriate.

Transaction processing application 132 may correspond to one or more processes to execute software modules and associated specialized hardware of transaction processor server 130 to provide payment services to merchants and users, for example though a account and/or payment instruments of the user to an account of the merchant. In this regard, transaction processing application 132 may correspond to specialized hardware and/or software to provide transaction processing and payment services through accounts, including digital wallets storing payment instruments. The services may allow for a payment to the merchant by a user through a payment instrument, including a credit/debit card, banking account, payment account with transaction processor server 130, and/or other funding instrument. In order to establish an account for a merchant and/or user to send and receive payments, transaction processing application 132 may receive information requesting establishment of the payment account. The information may include user personal, business, and/or financial information. Additionally the information may include a login, account name, password, PIN, or other account creation information. The merchant/user may provide a name, address, social security number, or other personal or business information necessary to establish the account and/or effectuate payments through the account. Transaction processing application 132 may further allow the merchant/user to service and maintain the payment account, for example, by adding and removing funding instruments.

Transaction processing application 132 may be used to provide a payment for a transaction to a merchant, for example, between communication device 110 and merchant device 120. The payment for a transaction may be effectuated through a plurality of different transaction processing flow types, such as a transaction processing flow type for personal transaction or "friends and family" transactions that occur between known users, such as if the user knows and trusts the other user. Such a transaction flow may also be utilized for payments between acquaintances and/or transfers, and may be free for use but not provide consumer protection. The transaction processing flow types may also include a commercial transaction flow for use in processing commercial transactions or "goods and services" transactions between entities desiring consumer protection for sales transactions, which may require a fee for use. Selection of the transaction processing flow type may be automatically entered by fraud protection application 140, and may, in certain embodiments, be changed through an interface output by transaction processing application 132. Once a transaction processing flow is entered, transaction processing application 132 may process the transaction in accordance with the services, processes, and features of the selected transaction processing flow. Transaction processing application 132 may debit an account of the user and provide the payment to an account of the merchant. Transaction processing application 132 may also be used to provide transaction histories for processed transactions.

In various embodiments, transaction processor server 130 includes other applications 134 as may be desired in particular embodiments to provide features to transaction processor server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing transaction processor server 130, where the user or other users may interact with the GUI to more easily view and communicate information. In various embodiments, other applications 134 may include connection and/or communication applications, which may be utilized to communicate information to over network 150.

Additionally, transaction processor server 130 includes database 136. As previously discussed, the user and/or the merchant may establish one or more digital wallets and/or accounts with transaction processor server 130. Digital wallets and/or accounts in database 136 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to transaction processor server 130, e.g., from communication device 110, one or more digital wallets and/or payment accounts belonging to the users may be found. Database 136 may also store the user preferences for an account for the user and/or merchant.

In various embodiments, transaction processor server 130 includes at least one network interface component 138 adapted to communicate communication device 110 and/or merchant device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
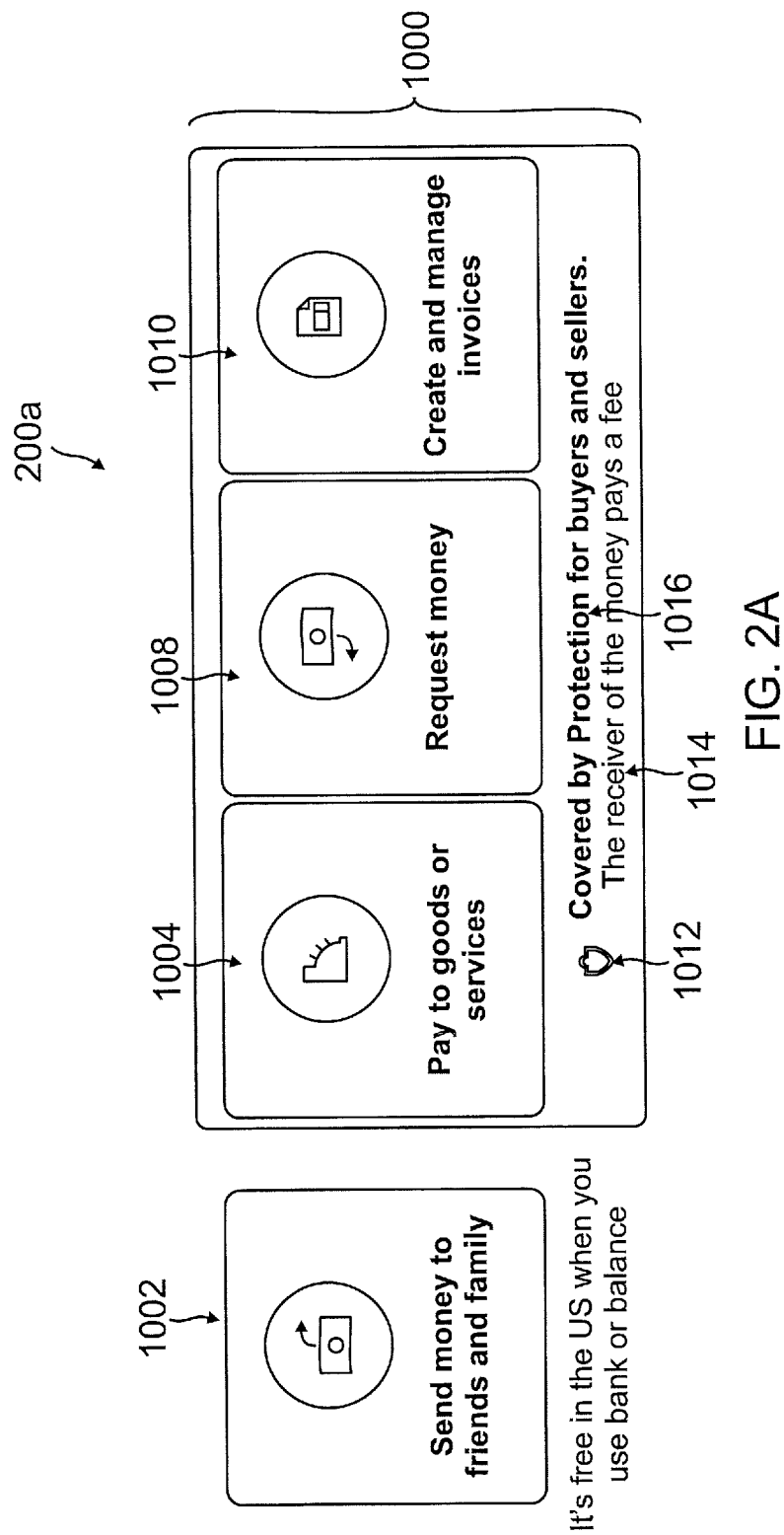
FIG. 2A is an exemplary selection interface for choosing a particular transaction processing flow type for use in transaction processing, according to an embodiment.

FIG. 2A is an exemplary selection interface for choosing a particular transaction processing flow type for use in transaction processing, according to an embodiment. Environment 200a includes a communication device 110 corresponding generally to the described features, processes, and components of communication device 110 in environment 100 of FIG. 1. In this regard, a user utilizing a communication device may view interface options 1000 on the communication device, where interface options 1000 corresponds to an interface of an application, such as service provider application 112 of communication device 110 in environment 100 of FIG. 1.

In this regard, interface options 1000 display various transaction processing flow types that may be selected by users, merchants, and/or other entities during transaction processing to process a transaction utilizing certain features, services, and/or processes provided by a service provider. For example, a personal transaction processing flow may be selected through a personal option 1002 in interface options 1000. Selection of personal option 1002 may initiate a transaction processing flow that provides transaction processing services between known users, such as friends or family. Such a transaction processing flow may provide free transaction processing, but may not provide consumer protection. In contrast, a sales option 1004, a payment request option 1008, and an invoice option 1010 may each provide commercial transaction processing for sales or other commercial transactions between entities. Such a transaction processing flow for commercial transactions associated with sales option 1004, payment request option 1008, and invoice option 1010 may require a fee to process a transaction, which may be paid by the buyer or deducted from payment to the seller, but may provide consumer protection. For example, interface options 1000 display a notification 1012 that alerts entities of a required fee 1014 as well as protection services 1016 to buyers and/or sellers.

Figure 2B:
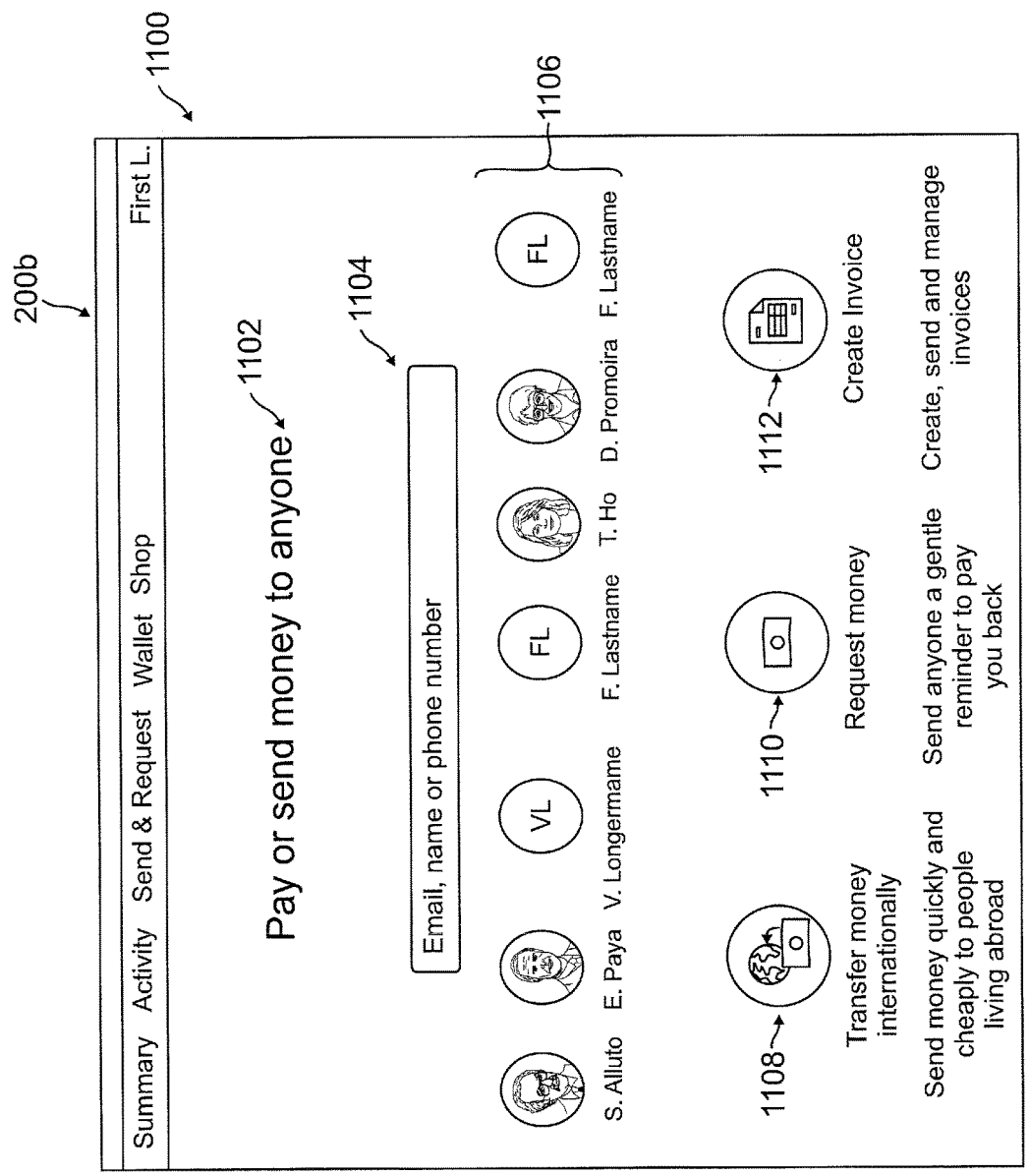
FIG. 2B is an exemplary transaction processing interface for entry of transaction information used in a risk analysis of selection of a particular transaction processing flow type, according to an embodiment.

FIG. 2B is an exemplary transaction processing interface for entry of transaction information used in a risk analysis of selection of a particular transaction processing flow type, according to an embodiment. Environment 200b includes a communication device corresponding generally to the described features, processes, and components of communication device 110 in environment 100 of FIG. 1. In this regard, a user utilizing the communication device may view an interface 1100 on the communication device, where interface 1100 corresponds to an interface of an application, such as service provider application 112 of communication device 110 in environment 100 of FIG. 1.

In this regard, interface 1100 displays a transaction processing menu 1102 for a transaction processing flow that allows an entity, such as a user, to engage in transaction processing for a transaction using a type of transaction processing flow accessible through transaction processing menu 1102. For example, transaction processing menu includes a recipient field 1104 that allows the entity wishing to engage in transaction processing using transaction processing menu 1102 to enter recipient information for a payment or the other entity involved in the transaction processing. Additionally, a contact list 1106 may allow the entity to quickly select from previous or known other entities to initiate a transaction processing request and provide a payment to such a contact. While viewing interface 1100, the entity may make a change and/or selection of a transaction processing flow by selecting a personal option 1108, a payment request option 1110, and/or an invoice option 1112. Selection of such an option may notify the service provider that the entity wishes to utilize a specific transaction processing flow. Based on processing the transaction information and/or the account information for the entities, the service provider may determine whether one or more of the entities are acting fraudulently in the transaction processing and flag one or more of their accounts as abusive.

FIG. 2C is an exemplary transaction processing interface after entry of input to the transaction processing flow, according to an embodiment. Environment 200c includes a communication device 110 corresponding generally to the described features, processes, and components of communication device 110 in environment 100 of FIG. 1. In this regard, a user utilizing communication device 110 may view an interface 1200 on communication device 110, where interface 1100 corresponds to an interface of a payment processing application, such as service provider application 112 of communication device 110 in environment 100 of FIG. 1.

In this regard, interface 1200 displays a payment menu 1202 for entry of input to enter transaction and/or payment information and enter a transaction processing flow. For example, based on selection of a recipient entity in FIG. 2B, recipient information 1204 may be populated in payment menu 1204. An entity utilizing payment menu 1202 may provide a value 1206 for processing, as well as enter a message into message field 1208. Utilizing information, such as transaction information including value 1206 and message field 1208 and account information, a transaction type may be determined by a service provider providing interface 1200. The service provider may utilize the transaction type to determine a transaction processing flow type required or suggested for processing the transaction type. In this regard, the service provider may automatically select the transaction processing flow type, for example, by adding or not adding input to box 1210. Information 1212 informs the buyer of the features and processes provided by selecting or unselecting box 1210 and entering into a transaction processing flow. Thus, if box 1210 is unselected, a personal transaction flow may be entered that does not include a fee but also does not provide purchase or consumer protection. However, selection of box 1210 allows for consumer protection but requires a fee. Thus, since box 1210 is unselected, a process for personal transaction processing is performed or canceled based on selection of navigation field 1214.

Figure 3:
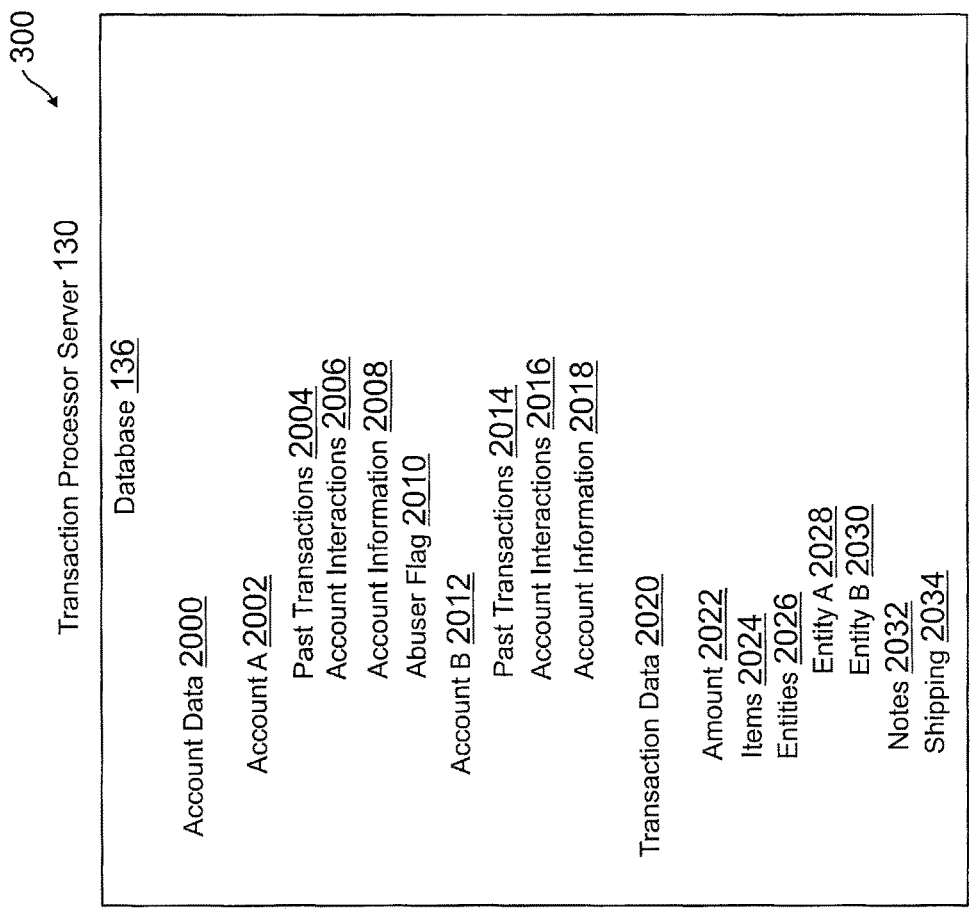
FIG. 3 is an exemplary system environment showing a database of a service provider having data used to provide risk analysis and fraud detection during transaction processing, according to an embodiment.

FIG. 3 is an exemplary system environment showing a database of a service provider having data used to provide risk analysis and fraud detection during transaction processing, according to an embodiment. FIG. 3 includes transaction processor server 130 discussed in reference to environment 100 of FIG. 1.

Transaction processor server 130 includes a database 136 having the data stored from one or more processing applications, such as those discussed in reference to environment 100 of FIG. 1. In this regard, database 136 includes data sufficient for a service provider, such as transaction processor server 130, to determine a transaction type for a transaction to be processed by the service provider, and further determine a transaction processing flow required or suggested to process the transaction.

For example, database 136 includes account data 2000 for one or more accounts held by the entities in the transaction. Thus, an entity may utilize account A 2002 to process one or more transactions. Account A 2002 includes past transactions 2004 processed by the account, which may be used to determine whether the account is engaging in a personal transaction between known users or a commercial transaction based on similar commercial transactions and/or with unknown users. In similar fashion, account interactions 2006 may be utilized to determine similar information based on interacting accounts with account A 2002. Account information 2008 may include entity information and/or financial information for use in determining the transaction type with another account, such as account B 2012. Moreover, account A 2002 may be flagged as an abuser of a particular type of transaction processing flow based on abuser flag 2010. Thus, an account interacting with account A 2002, such as account B 2012 may include past transactions, 2014, account interactions 2016, and/or account information 2018 utilized to determine a transaction type for a transaction with account A 2002 and a transaction processing flow type for processing the transaction with account A 2002.

Database 136 may further include transaction data 2020 for a transaction to be processed between account A 2002 and account B 2012. Transaction data 2020 may further be utilized by a service provider, such as transaction processor server 130, to determine a transaction type and associated transaction processing flow type. For example, transaction data 2020 may include an amount 2022 for the transaction, items 2024 in the transactions, and entities 2026 (e.g., an entity A 2028 associated with account A 2002 and an entity B 2030 associated with account 2012) involved in the transaction. Additionally, transaction data 2020 may include notes 2032, which may be processed to determine key words, terms, or phrases that indicate a transaction type. Moreover, shipping 2034 may indicate shipping information of one or more entities that may further be used to determine a transaction type.

Figure 4:
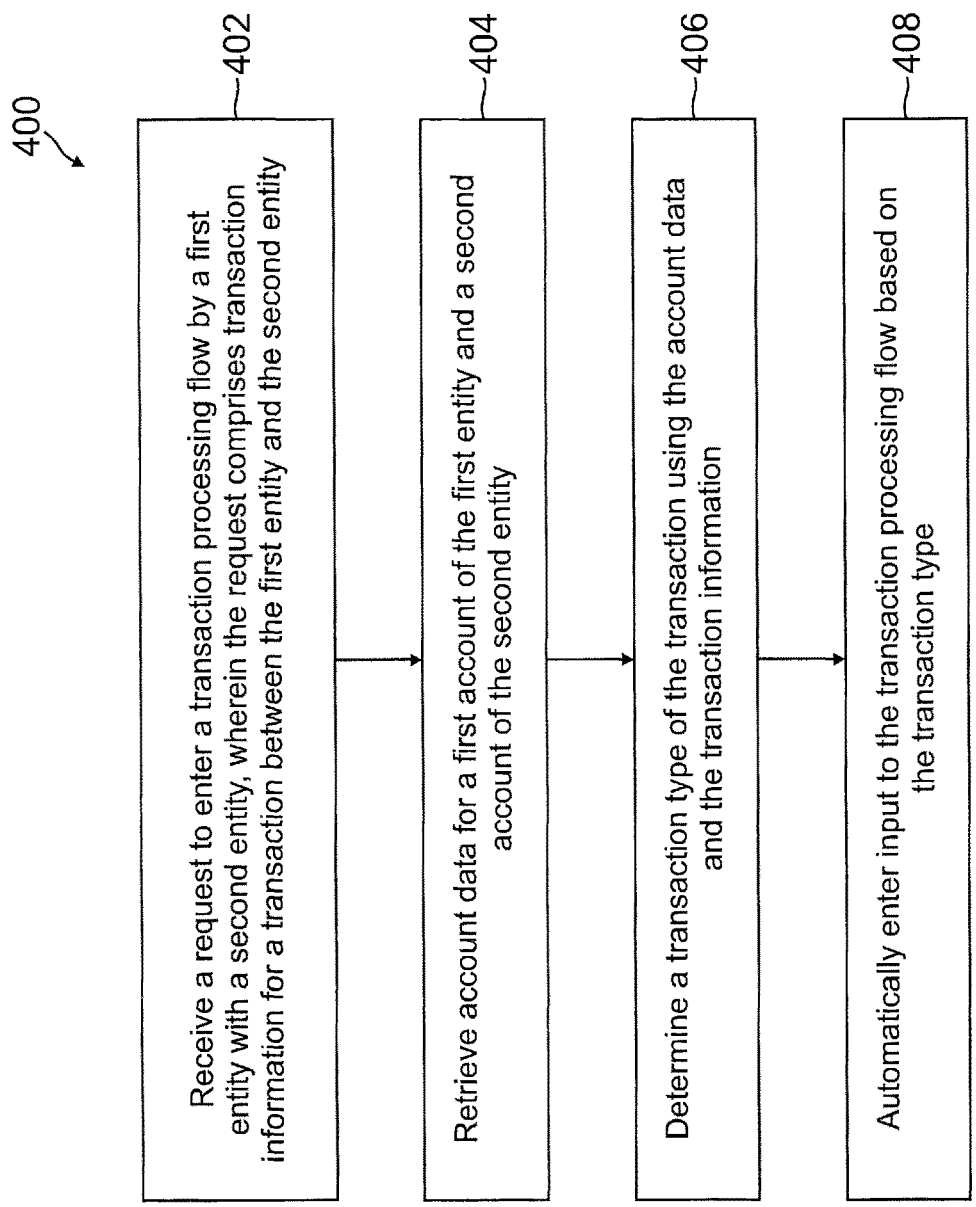
FIG. 4 is a flowchart of an exemplary process for risk analysis and fraud detection for electronic transaction processing flows, according to an embodiment.

FIG. 4 is a flowchart of an exemplary process for risk analysis and fraud detection for electronic transaction processing flows, according to an embodiment. Note that one or more steps, processes, and methods described herein may be omitted, performed in a different sequence, or combined as desired or appropriate.

At step 402, a request to enter a transaction processing flow by a first entity with a second entity is received, wherein the request comprises transaction information for a transaction between the first entity and the second entity. The transaction information may comprise at least one of an amount for the transaction, at least one item in the transaction, data in a note field associated with the transaction, parties to the transaction, or shipping information for the transaction.

At step 404, account data for a first account of the first entity and a second account of the second entity is retrieved, for example, accessed from a database. The account data for the first account and the second account may comprise at least one abuser flag for at least one of the first entity or the second entity. The at least one abuser flag may flag or identify the at least one of the first entity or the second entity as an abuser if the at least one of the first entity or the second entity previously fraudulently used a transaction processing flow type for the transaction processing flow that did not require a fee for use of the transaction processing flow type. The account data may comprise at least one of a name for the first entity or the second entity, an address for the first entity or the second entity, an entity type for the first entity or the second entity, a shared entity status for the first entity and the second entity, previously account interactions for the first account and the second account, amount of sent or received payments for the first account or the second account, or number of other accounts interacting with the first account or the second account.

A transaction type of the transaction is determined using the account data and the transaction information, at step 406. The transaction type may be determined based on a transaction amount, an item in the transaction, an address for the transaction, an account history for the first account and the second account, or a message associated with the transaction. At step 408, input is automatically entered to the transaction processing flow for the first entity based on the transaction type, for example by automatically selecting a transaction processing flow type for use by the first entity based on the transaction type. The input may be entered to a graphical user interface as a selection of an option within a field of the graphical user interface. The graphical user interface may be displayed from a webpage for a payment provider service associated with the transaction processing flow or dedicated application for the payment provider service. Thus, the input may comprise a selection of a transaction processing flow type for the transaction processing flow to process the transaction based on the transaction type. The input may therefore pre-select one of a merchant transaction processing flow type or a personal transaction processing flow type. The input may automatically select a transaction processing flow type having no fee for use of the transaction processing flow type when only the first account and the second account previously interacted.

In various embodiments, the selection of the transaction processing flow type comprises a merchant sale flow for processing the transaction, wherein merchant sale flow requires a fee for use of the merchant sale flow to process the transaction. In other embodiments, the selection of the transaction processing flow type comprises a personal transfer flow for processing the transaction, wherein the personal transfer flow does not require a fee for use of the friends and family transfer flow. Thus, the selection of the transaction processing flow type determines at least one of fees for the transaction, buyer protection for the transaction, insurance for a payment or an item in the transaction, or reimbursement procedures for fraud in the transaction. Moreover, an option may be provided to the first entity, wherein the option allows the first entity to change the input to the transaction processing flow. Thus, a change to the input in the selectable field by the first entity may be received, wherein a selection of a transaction processing flow type for the transaction processing flow is changed based on the change to the input. In response to receiving the change, information may be provided to the first entity about a previously selected transaction processing flow type, and wherein the information comprises available features and unavailable features for the previously selected transaction processing flow type.

Figure 5:
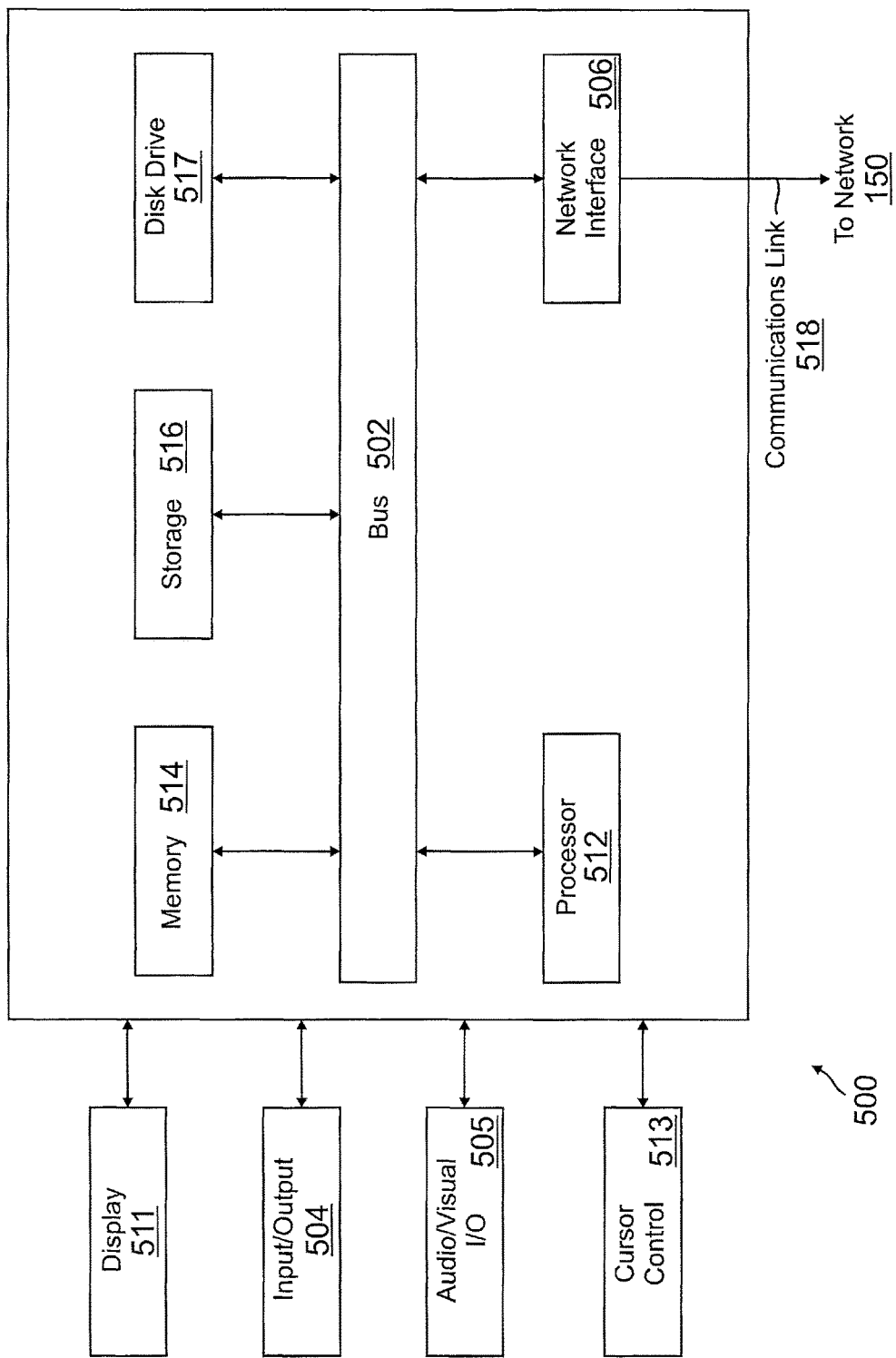
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory storing account data for a first account of a first entity and a second account of a second entity; and
    one or more hardware processors configured to execute instructions to cause the system to perform operations comprising:
        receiving a request to enter a transaction processing flow by the first entity with the second entity through a graphical user interface (GUI) provided by the system, wherein the request comprises transaction information for a transaction between the first entity and the second entity obtained from a first interface field of the GUI;
        accessing the account data for the first account of the first entity and the second account of the second entity, wherein the account data comprises at least one abuser flag for at least one of the first entity or the second entity, and wherein the at least one abuser flag is associated with at least one fraudulent use of the transaction processing flow;
        determining a message associated with the transaction that was transmitted between the first entity and the second entity during the transaction;
        analyzing a key word in the message;
        determining that the key word is associated with one of a personal transaction or a commercial transaction based on the analyzing;
        determining a transaction type of the transaction based on the account data, the transaction information, and the key word associated with the one of the personal transaction or the commercial transaction;
        determining, based on the at least one abuser flag, a message field for the message, and the transaction type, that the first entity is attempting to access an incorrect transaction processing flow type for processing the transaction by the transaction processing flow, wherein the incorrect transaction processing flow is processed by a first set of data processing operations associated with first digital information for the transaction processing flow;
        determining that the first entity is acting fraudulently based on the first entity attempting to access the incorrect transaction processing flow type;
        flagging the transaction as an abusive transaction attempting to access the incorrect transaction processing flow type;
        determining a user interface selection option associated with a data processing requirement for the processing the transaction by the transaction processing flow using an adjusted transaction processing flow type, wherein the adjusted transaction processing flow is processed by a second set of data processing operations associated with second digital information for the transaction processing flow;
        causing to be changed, within the GUI provided by the system, the transaction processing flow from the incorrect transaction processing flow type to the adjusted transaction processing flow type;
        providing data to the transaction processing flow for the adjusted transaction processing flow type; and
        automatically selecting, within the GUI, a second interface field for the adjusted transaction processing flow type during the transaction processing flow based on the message, the transaction type, and the data processing requirement.

2. The system of claim 1, wherein the GUI is displayed on one of a webpage for a payment provider service associated with the transaction processing flow or a dedicated application for the payment provider service, and wherein the GUI comprises a plurality of selectable interface options associated with a request for the first data processing operations or the second data processing operations.

3. The system of claim 1, wherein the second interface field comprises a field for a selection of the adjusted transaction processing flow type for the transaction processing flow to process the transaction based on the transaction type.

4. The system of claim 3, wherein the selection of the adjusted transaction processing flow type comprises a merchant sale flow for processing the transaction, and wherein merchant sale flow requires a fee for use of the merchant sale flow to process the transaction.

5. The system of claim 3, wherein the selection of the adjusted transaction processing flow type comprises a personal transfer flow for processing the transaction, and wherein the personal transfer flow does not require a fee for use of the personal transfer flow.

6. The system of claim 3, wherein the selection of the adjusted transaction processing flow type determines at least one of fees for the transaction, buyer protection for the transaction, insurance for a payment or an item in the transaction, or reimbursement procedures for fraud in the transaction.

7. The system of claim 1, wherein the operations further comprising:
    providing an option to the first entity, wherein the option allows the first entity to change data in the second interface field of the transaction processing flow, and wherein the option requires a confirmation by the first entity and the second entity to change the data in the second interface field.

8. The system of claim 7, wherein the option comprises a selectable field within an interface, and wherein the operations further comprise:
    receiving a change to the second interface field by the first entity;
    requesting the confirmation from the first entity and the second entity; and
    alerting the first entity and the second entity of a feature change to the transaction processing flow based on the change.

9. The system of claim 8, wherein the operations further comprise:
in response to receiving the change, providing information to the first entity about a previously selected transaction processing flow type, and wherein the information comprises available features and unavailable features for the previously selected transaction processing flow type.

10. A method comprising:
receiving a request to enter a transaction processing flow by a first entity with a second entity through a graphical user interface (GUI) provided by a service provider system associated with the transaction processing flow, wherein the request comprises transaction information for a transaction between the first entity and the second entity obtained from a first interface field of the GUI;
retrieving account data for a first account of the first entity and a second account of the second entity, wherein the account data comprises at least one abuser flag for at least one of the first entity or the second entity, and wherein the at least one abuser flag is associated with at least one fraudulent use of the transaction processing flow;
determining a message associated with the transaction that was transmitted between the first entity and the second entity during the transaction;
analyzing a key word in the message;
determining that the key word is associated with one of a personal transaction or a commercial transaction based on the analyzing;
determining a transaction type of the transaction based on the account data, the transaction information, and the key word associated with the one of the personal transaction or the commercial transaction;
determining, based on the at least one abuser flag, a message field for the message, and the transaction type, that the first entity is attempting to access an incorrect transaction processing flow type for processing the transaction by the transaction processing flow, wherein the incorrect transaction processing flow is processed by a first set of data processing operations associated with first digital information for the transaction processing flow;
determining that the first entity is acting fraudulently based on the first entity attempting to access the incorrect transaction processing flow type;
flagging the transaction as an abusive transaction attempting to access the incorrect transaction processing flow type;
determining a user interface selection option associated with a data processing requirement for the processing the transaction by the transaction processing flow using an adjusted transaction processing flow type, wherein the adjusted transaction processing flow is processed by a second set of data processing operations associated with second digital information for the transaction processing flow;
causing to be changed, within the GUI provided by the system, the transaction processing flow from the incorrect transaction processing flow type to the adjusted transaction processing flow type;
providing data to the transaction processing flow for the adjusted transaction processing flow type; and
automatically selecting, within the GUI, a second interface field for the adjusted transaction processing flow type during the transaction processing flow based on the message, the transaction type, and the data processing requirement.

11. The method of claim 10, further comprising:
generating the at least one abuser flag based on at least one of the first entity or the second entity fraudulently using a free transaction processing flow that did not require a fee for use of the free transaction processing flow during at least one previous transaction.

12. The method of claim 10, wherein the transaction information comprises at least one of an amount for the transaction, at least one item in the transaction, or shipping information for the transaction.

13. The method of claim 10, wherein the account data comprises at least one of a name for the first entity or the second entity, an address for the first entity or the second entity, an entity type for the first entity or the second entity, a shared entity status for the first entity and the second entity, a previously account interaction for the first account and the second account, an amount of a sent or a received payment for the first account or the second account, or a number of other accounts interacting with the first account or the second account.

14. The method of claim 10, wherein the automatically selecting comprises automatically pre-selecting one of a merchant transaction processing flow type or a personal transaction processing flow type in the second interface field.

15. The method of claim 10, further comprising:
providing an option to change the transaction processing flow type, wherein a selection of the option requires an acceptance of the selection by the first entity.

16. The method of claim 10, wherein the adjusted transaction processing flow type having no fee for use of the adjusted transaction processing flow type is based on a previous interaction between the first account and the second account.

17. A non-transitory machine-readable medium having stored thereon machine-readable instructions executable to cause a machine to perform operations comprising:
receiving a request to enter a transaction processing flow by a first entity with a second entity through a graphical user interface (GUI) provided by service provider system associated with the transaction processing flow, wherein the request comprises transaction information for a transaction between the first entity and the second entity obtained from a first interface field of the GUI;
retrieving account data for a first account of the first entity and a second account of the second entity, wherein the account data comprises at least one abuser flag for at least one of the first entity or the second entity, and wherein the at least one abuser flag is associated with at least one fraudulent use of the transaction processing flow;
determining a message associated with the transaction that was transmitted between the first entity and the second entity during the transaction;
analyzing a key word in the message;
determining that the key word is associated with one of a personal transaction or a commercial transaction based on the analyzing;
determining a transaction type of the transaction based on the account data, the transaction information, and the key word associated with the one of the personal transaction or the commercial transaction;
determining, based on the at least one abuser flag, a message field for the message, and the transaction type, that the first entity is attempting to access an incorrect transaction processing flow type for processing the transaction by the transaction processing flow, wherein the incorrect transaction processing flow is processed by a first set of data processing operations associated with first digital information for the transaction processing flow;

determining that the first entity is acting fraudulently based on the first entity attempting to access the incorrect transaction processing flow type;

flagging the transaction as an abusive transaction attempting to access the incorrect transaction processing flow type;

determining a user interface selection option associated with a data processing requirement for the processing the transaction by the transaction processing flow using an adjusted transaction processing flow type, wherein the adjusted transaction processing flow is processed by a second set of data processing operations associated with second digital information for the transaction processing flow;

causing to be changed, within the GUI provided by the system, the transaction processing flow from the incorrect transaction processing flow type to the adjusted transaction processing flow type;

providing data to the transaction processing flow for the adjusted transaction processing flow type; and automatically selecting, within the GUI, a second interface field for the adjusted transaction processing flow type during the transaction processing flow for the first entity based on the message, the transaction type, and the data processing requirement.

18. The non-transitory machine-readable medium of claim 17, wherein the transaction type is further determined based on a transaction amount, an item in the transaction, an address for the transaction, or an account history for the first account and/or the second account.

19. The system of claim 1, wherein the operations further comprise:
determining a risk analysis associated with the transaction, wherein the risk analysis is associated with a risk policy for the determined transaction type,
wherein the second interface field is further selected based on the risk analysis, and wherein the second interface field comprises a fraud protection policy for the transaction.

20. The system of claim 1, wherein the incorrect transaction processing flow type does not require a fee for use of the incorrect transaction processing flow type for processing the transaction.

\* \* \* \* \*